D. W. De FOREST.
Nut-Locks.

No. 152,344.

Patented June 23, 1874.

Witnesses:
W. Burris
C. B. Archer

Inventor:
David W. De Forest
per G. B. Towles att.

UNITED STATES PATENT OFFICE.

DAVID W. DE FOREST, OF PETERSBURG, VIRGINIA.

IMPROVEMENT IN NUT-LOCKS.

Specification forming part of Letters Patent No. 152,344, dated June 23, 1874; application filed December 1, 1873.

*To all whom it may concern:*

Be it known that I, DAVID W. DE FOREST, of Petersburg, in the county of Dinwiddie and State of Virginia, have invented certain new and useful Improvements in Nut-Locks; and I do hereby declare the following to be a full, clear, and exact description of the invention, such as will enable others skilled in the art to which it pertains to make and use it, reference being had to the accompanying drawings, which form part of this specification.

Figure 1:
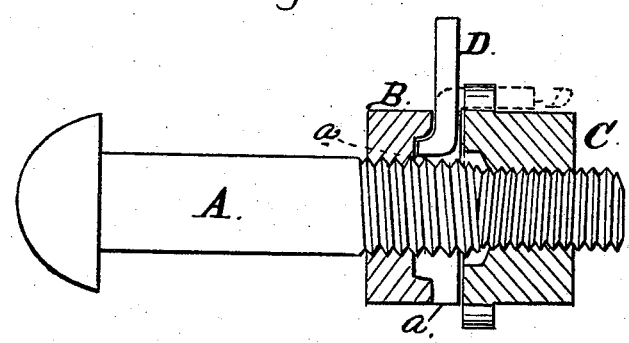
Figure 2:
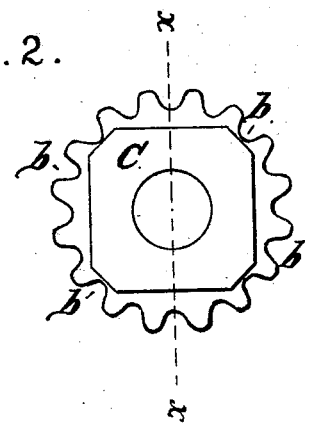

Figure 1 is a longitudinal section of my improved nut-lock, as indicated by the dotted lines $x$ $x$ of Fig. 2. Fig. 2 is a plan view of left-hand or outer nut detached from bolt.

Like letters in both figures of the drawing indicate like parts.

This invention relates to the right-and-left-hand screw-bolt of a nut-lock, having the inner or right-hand nut provided with a groove made to terminate at right angles in the hole of the nut, in combination with a wire key, formed so as to readily fit the said groove, so that by means of a notched or corrugated rim or flange formed on the left-hand or outer nut the said nuts can be securely locked, so as to avoid all liability of their becoming released by any jarring motion to which they may be subjected.

A represents the bolt; B C, the right and left hand nuts, and D the key. The groove $a$ is made to run centrally from the edge of nut B to the hole, where it terminates (see Fig. 1) at right angles in the hole, over the threads of the bolt. The key D, which consists of wire or any pliable material, is made to fit the groove, with its end bent, as seen in the drawing, to fit the angular portion thereof. The nut C is formed with a rim or flange having notches or corrugations $b$. Thus, to lock the nuts, the key is inserted in the groove (see Fig. 1) of nut B after it has been screwed on the bolt, and nut C screwed up fast against B over the key, which latter, being made to project out from the edge of the nut, is then bent over into one of the notches of the rim or flange of nut C, so that it will be seen no jarring motion can possibly release or unlock the nuts. In screwing nut C on, a notch will always come at the point desired to fasten the key.

Having thus fully described my invention, what I claim therein as new, and desire to secure by Letters Patent, is—

The wire key D, in combination with the groove $a$ of the nut B, and the notches $b$ of the flange of the nut C, substantially as and for the purpose set forth.

In testimony that I claim the foregoing I have hereunto set my hand this 5th day of July, 1873.

DAVID WM. DE FOREST.

Witnesses:
    W. BURRIS,
    A. MOORE.